United States Patent
Takahashi

(10) Patent No.: US 11,187,888 B2
(45) Date of Patent: Nov. 30, 2021

(54) LIGHT SOURCE DEVICE, PROJECTOR, AND CHROMATICITY ADJUSTMENT METHOD

(71) Applicant: NEC Display Solutions, Ltd., Tokyo (JP)

(72) Inventor: Isao Takahashi, Tokyo (JP)

(73) Assignee: SHARP NEC DISPLAY SOLUTIONS, LTD., Tokyo (JP)

(*) Notice: Subject to any disclaimer, the term of this patent is extended or adjusted under 35 U.S.C. 154(b) by 0 days.

(21) Appl. No.: 16/648,578

(22) PCT Filed: Nov. 24, 2017

(86) PCT No.: PCT/JP2017/042264
§ 371 (c)(1),
(2) Date: Mar. 18, 2020

(87) PCT Pub. No.: WO2019/102596
PCT Pub. Date: May 31, 2019

(65) Prior Publication Data
US 2020/0218058 A1    Jul. 9, 2020

(51) Int. Cl.
*G02B 26/00* (2006.01)
*G01J 3/50* (2006.01)
(Continued)

(52) U.S. Cl.
CPC ............ *G02B 26/008* (2013.01); *G01J 3/505* (2013.01); *G03B 21/204* (2013.01); *H04N 9/3164* (2013.01); *H04N 9/3182* (2013.01)

(58) Field of Classification Search
CPC ..... G02B 26/008; G01J 3/505; G03B 21/204; G03B 21/00; G03B 21/14; F21V 9/00
See application file for complete search history.

(56) References Cited

U.S. PATENT DOCUMENTS 3,838,816 A * 10/1974 Huff ................. B05B 17/08
                                                          239/18
5,668,572 A *  9/1997 Meyer ............. G02B 26/008
                                                          345/697
(Continued)

FOREIGN PATENT DOCUMENTS

CN    106597786 A    4/2017
CN    106842784 A    6/2017
(Continued)

OTHER PUBLICATIONS

United States Office Action dated May 21, 2021 in U.S. Appl. No. 16/757,282.
(Continued)

*Primary Examiner* — Bryon T Gyllstrom
(74) *Attorney, Agent, or Firm* — McGinn I.P. Law Group, PLLC.

(57) ABSTRACT

A light source device, a projector, and a chromaticity adjustment method, which are resistant to a change in the color of emitted light even if used for a long period of time, includes: an excitation light source that emits excitation light; a phosphor wheel that is irradiated with excitation light to convert a part of excitation light into fluorescent light and that emits mixed color light including the fluorescent light and a remaining part of excitation light; motor that rotates phosphor wheel; and an adjustment unit that adjusts the rotational frequency of motor so that the chromaticity of mixed color light emitted from phosphor wheel becomes a predetermined value.

20 Claims, 5 Drawing Sheets

(51) Int. Cl.
    *G03B 21/20* (2006.01)
    *H04N 9/31* (2006.01)

(56) References Cited

U.S. PATENT DOCUMENTS

| | | | |
|---|---|---|---|
| 8,354,790 B2 * | 1/2013 | Iwanaga | G03B 21/204 |
| | | | 313/506 |
| 2002/0109821 A1 * | 8/2002 | Huibers | G02B 26/023 |
| | | | 353/84 |
| 2004/0008288 A1 * | 1/2004 | Pate | H04N 9/3182 |
| | | | 348/742 |
| 2006/0268387 A1 * | 11/2006 | Lianza | G02B 26/0833 |
| | | | 359/290 |
| 2008/0100533 A1 * | 5/2008 | Chuang | H04N 9/3111 |
| | | | 345/52 |
| 2009/0284148 A1 | 11/2009 | Iwanaga | |
| 2011/0096296 A1 * | 4/2011 | Ogawa | G03B 21/204 |
| | | | 353/31 |
| 2012/0062857 A1 | 3/2012 | Saitou et al. | |
| 2012/0106126 A1 | 5/2012 | Nojima et al. | |
| 2014/0140038 A1 * | 5/2014 | Gerets | F21V 13/14 |
| | | | 362/84 |
| 2014/0146293 A1 | 5/2014 | Hirata et al. | |
| 2015/0205190 A1 | 7/2015 | Fukami et al. | |
| 2016/0077417 A1 | 3/2016 | Ishikawa | |
| 2017/0289511 A1 | 10/2017 | Usami | |
| 2018/0199013 A1 * | 7/2018 | Wu | H04N 9/3158 |
| 2019/0211263 A1 | 7/2019 | Maeda et al. | |
| 2019/0369469 A1 | 12/2019 | Ishige et al. | |

FOREIGN PATENT DOCUMENTS

| | | |
|---|---|---|
| JP | 4678556 B2 | 4/2011 |
| JP | 2012-047951 A | 3/2012 |
| JP | 2012-088657 A | 5/2012 |
| JP | 2014-235323 A | 12/2014 |
| JP | 2015-129783 A | 7/2015 |
| JP | 2015-138045 A | 7/2015 |
| JP | 2016-058638 A | 4/2016 |
| JP | 2016-161738 A | 9/2016 |
| JP | 2016-224115 A | 12/2016 |
| JP | 2017-142459 a | 8/2017 |
| JP | 2017-161641 A | 9/2017 |
| KR | 2017-0078385 A | 7/2017 |
| WO | WO 2016/009533 A1 | 1/2016 |
| WO | WO 2016/051537 A1 | 4/2016 |

OTHER PUBLICATIONS

International Search Report (ISR) (PCT Form PCT/ISA/210), in PCT/JP2017/042264, dated Feb. 13, 2018.
Chinese Office Action, dated Mar. 16, 2021, in Chinese Application No. 201880075455.6 and English Translation thereof.
United States Office Action dated Sep. 30, 2021 in U.S. Appl. No. 16/757,282.

* cited by examiner

[Fig. 1]
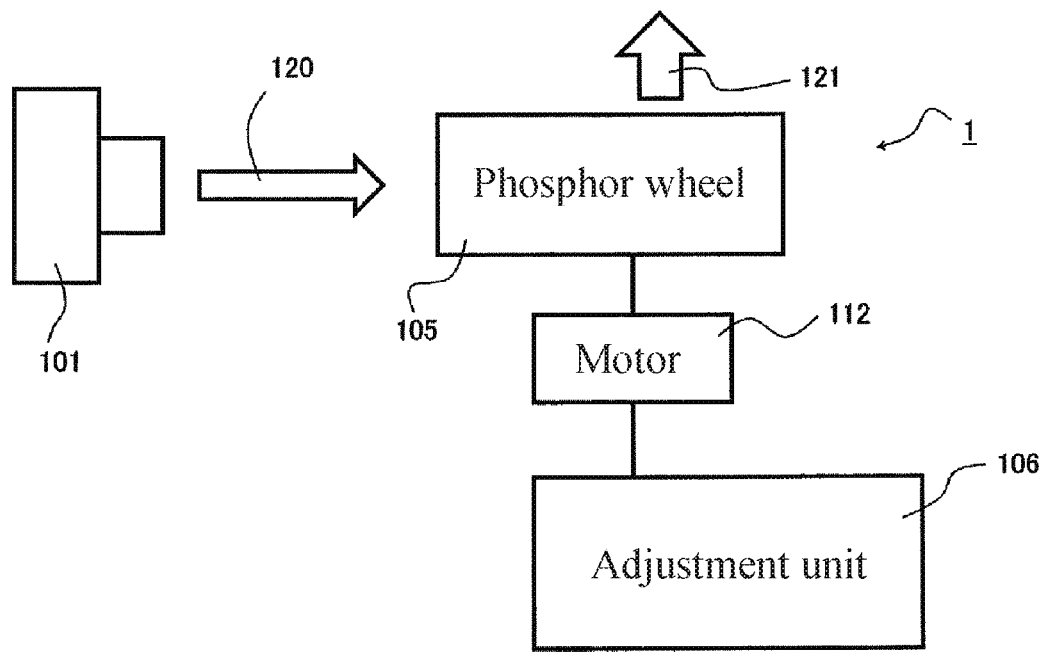
[Fig. 2]
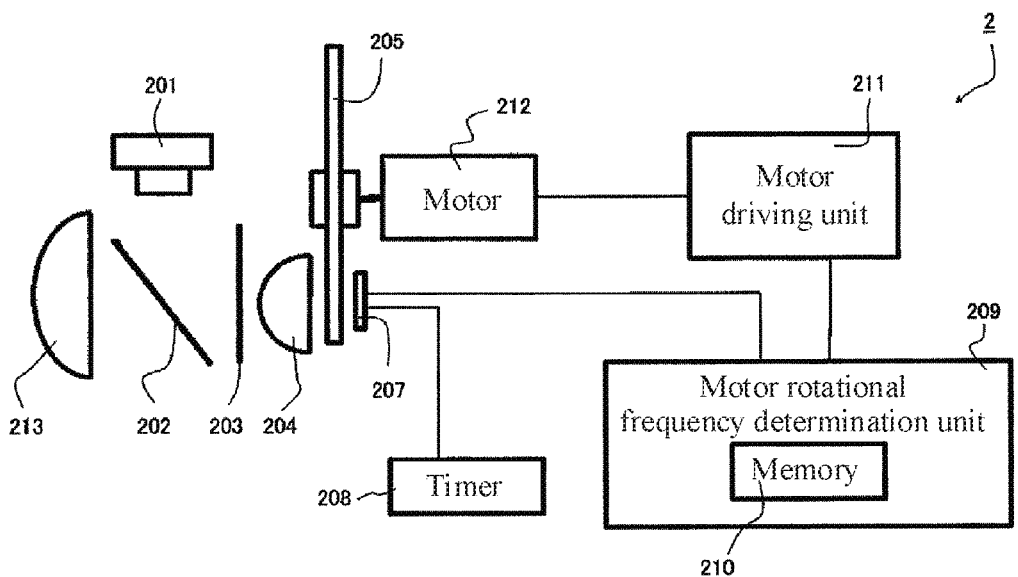

[Fig. 3]
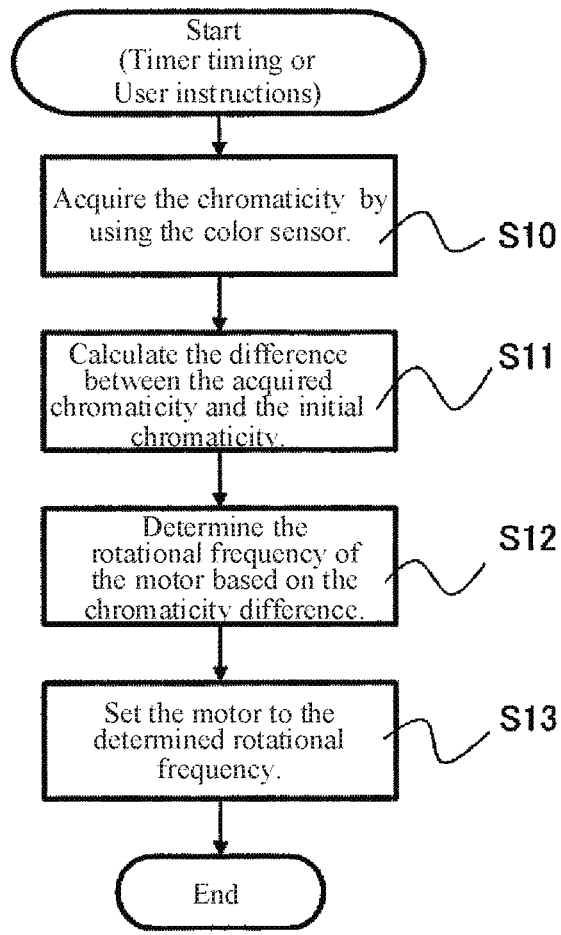
[Fig. 4]
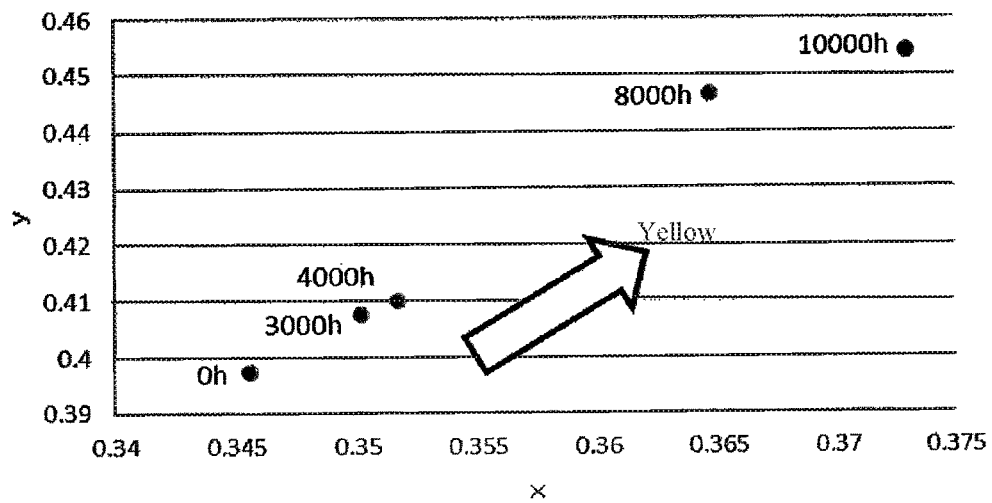

[Fig. 5]
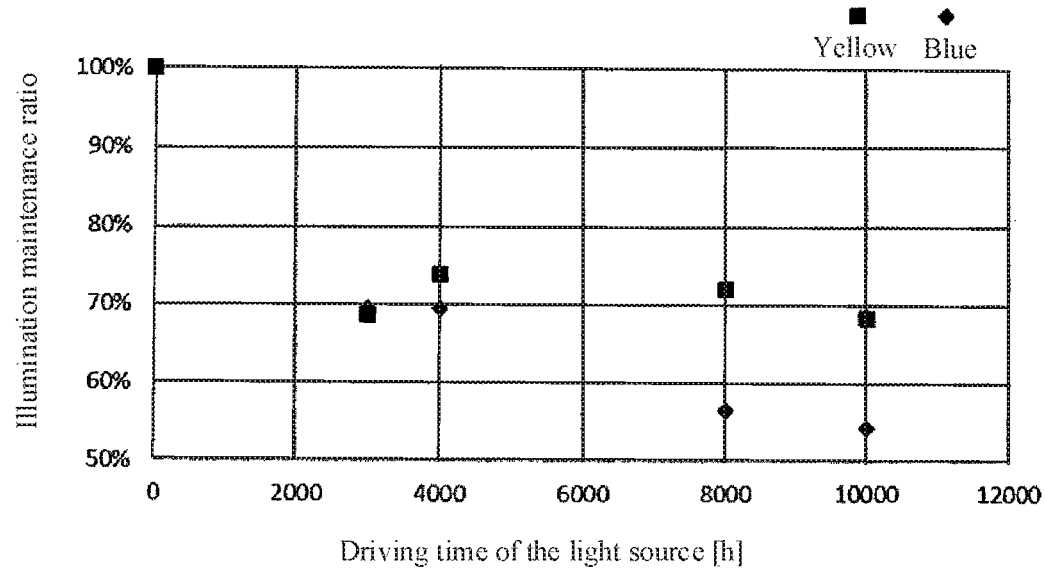
[Fig. 6]
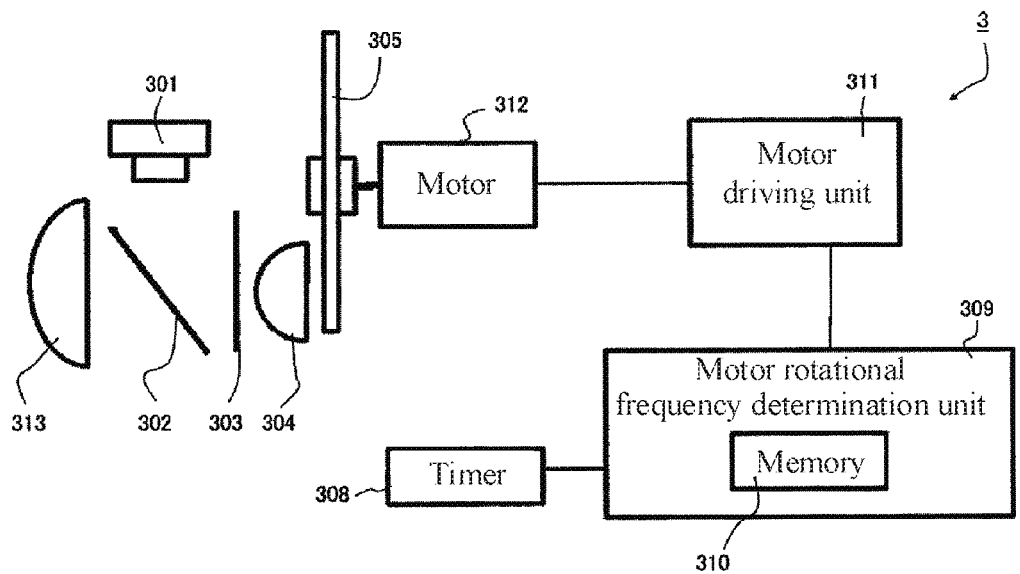

[Fig. 7]
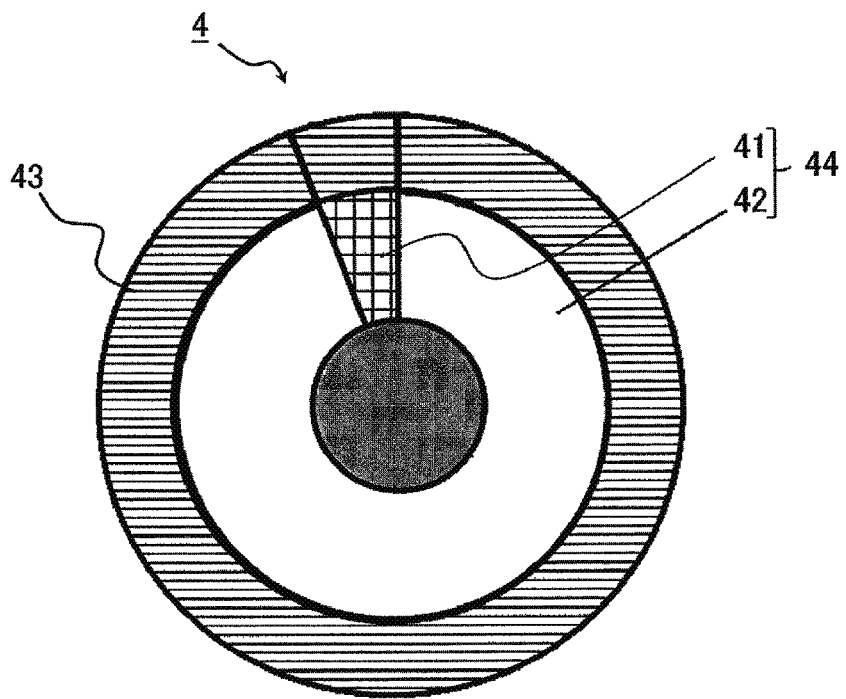
[Fig. 8]
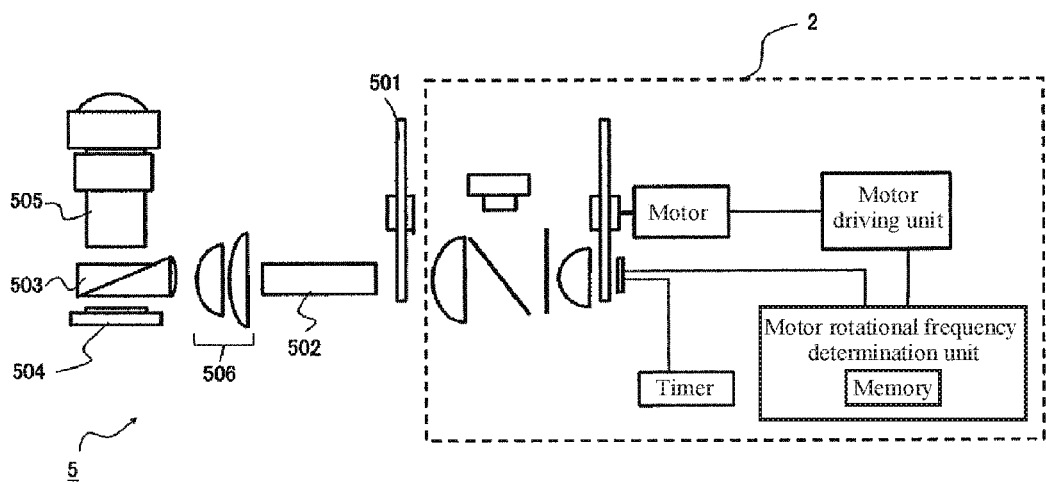

[Fig. 9]
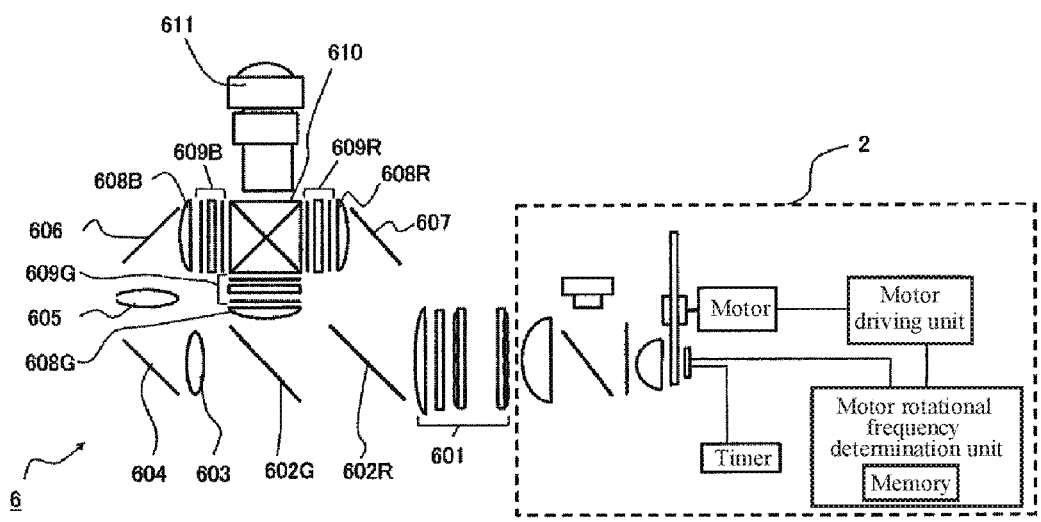

LIGHT SOURCE DEVICE, PROJECTOR, AND CHROMATICITY ADJUSTMENT METHOD

TECHNICAL FIELD

The present invention relates to a light source device, a projector, and a chromaticity adjustment method.

BACKGROUND ART

Some recent projectors include a light source device that combines a phosphor with a solid-state light source such as an LD (Laser Diode) or an LED (Light Emitting Diode) to obtain white light.

Patent Document 1 describes an example of a light source device in which a phosphor and a solid-state light source such as an LD are used to obtain white light. The light source device described in Patent Document 1 includes an excitation light source that emits blue excitation light and a phosphor wheel. The phosphor wheel includes a rotatable rotation substrate and a phosphor layer formed on the rotation substrate over the entire periphery. Excitation light is condensed onto the phosphor layer via a condenser lens. The phosphor layer includes a phosphor that is excited by excitation light to emit yellow fluorescent light. Excitation light is irradiated to the phosphor layer in a state in which the rotation substrate is rotated at a constant rotation speed. A part of the excitation light passes through the phosphor layer, and the remaining part is absorbed by the phosphor for conversion into yellow fluorescent light. Blue light (excitation light) that passed through the phosphor layer and yellow fluorescent light that is emitted by the phosphor are synthesized to obtain white light.

Another example of a light source device using a phosphor, which is not a white light source, is described in Patent Document 2. The light source device described in Patent Document 2 includes a light source, a rotation body which is provided with a phosphor layer for converting light emitted from the light source into fluorescent light, a driving source for rotating the rotation body, a control means for controlling the rotation speed of the rotation body, and temperature measurement means for measuring the temperature of the rotation body.

The phosphor has a property in which conversion efficiency (also referred to as internal quantum efficiency) of converting excitation energy obtained from excitation light to fluorescent light decreases as the temperature of the phosphor increases. According to this property, when the temperature of the phosphor changes, the amount of light output from the light source device may decrease.

In the light source device described in Patent Document 2, the control means controls the rotation speed of the rotation body with the phosphor layer based on the temperature information supplied from the temperature measuring means. When the rotation body rotates, the air around the rotating body is swirled in the rotational direction of the rotation body by the frictional force between the rotation body and the air molecules. The swirled air forms a flow in the radial direction of the rotation body. In this manner, the rotation body can be cooled by rotating the rotation body to generate air flow.

The amount of air flow is changed in accordance with the rotation speed of the rotation body. The higher the amount of air flow, i.e., the higher the rotational speed, the greater is the effect of cooling the rotation body. In the light source device described in Patent Document 2, the rotation speed of the rotation body is controlled based on temperature information from the temperature measuring means, thereby maintaining the temperature of the rotation body at a predetermined value.

LITERATURE OF THE PRIOR ART

Patent Literature

Patent Document 1: JP-A-2012-088657
Patent Document 2: U.S. Pat. No. 4,678,556

DISCLOSURE OF THE INVENTION

Problems to be Solved by the Invention

In the light source device described in Patent Document 1, when the excitation light source is used for a long period of time, the amount of excitation light emitted by the excitation light source may be decreased. In this case, the amount of excitation light irradiated to the phosphor layer of the phosphor wheel changes, and the temperature of the phosphor changes. When the temperature of the phosphor changes, since the internal quantum efficiency of the phosphor layer changes, the amount of fluorescent light emitted by the phosphor may change.

In addition, the amount of fluorescent light emitted by the phosphor may change due to deterioration of the phosphor because of aging.

In this manner, when the amount of fluorescence emitted by the phosphor changes, the ratio between the fluorescence and the excitation light that are included in white light emitted from the light source device may change. Thus, in the light source device described in Patent Document 1, there is a problem in which the color of white light emitted from the light source device changes.

If the method of controlling the retaining speed according to the temperature of the rotation body described in Patent Document 2 is applied to the light source device described in Patent Document 1, the temperature of the phosphor wheel, which is the rotation body, can be maintained at a predetermined value. However, it is difficult to prevent a change in the hue of white light due to aged deterioration of the above-mentioned excitation light source, phosphor, or the like by merely maintaining the temperature of the phosphor wheel at a predetermined value.

It is an object of the present invention to provide a light source device, a projector, and a chromaticity adjustment method which can solve the above-mentioned problems and which barely change the color of emitted light even if used for a long period of time.

Means for Solving the Problem

In order to achieve the above object, a first light source device of the present invention includes: an excitation light source that emits excitation light; a phosphor wheel in which the excitation light is irradiated to convert a part of the excitation light into fluorescent light, the phosphor wheel emitting mixed color light including the fluorescent light and a remaining part of the excitation light; a motor that rotates the phosphor wheel; and an adjustment unit that adjusts a rotational frequency of the motor so that a chromaticity of the mixed color light emitted from the phosphor wheel becomes a predetermined value.

A first projector of the present invention includes the above-mentioned light source device, an image forming element that modulates light emitted from the light source device to form an image, and a projection lens that projects the image.

A first chromaticity adjustment method of the present invention, which is a chromaticity adjustment method in a light source device that includes a phosphor wheel that converts a part of excitation light into fluorescent light to emit mixed color light that includes the fluorescent light and a remaining part of the excitation light, includes: rotating the phosphor wheel; and adjusting a rotational speed of the phosphor wheel such that a chromaticity of the mixed color light emitted from the phosphor wheel becomes a predetermined value.

Effects of the Invention

According to the present invention, it is possible to prevent a change in color of light emitted from the light source device even if the light source device is used for a long period of time.

BRIEF DESCRIPTION OF THE DRAWINGS

FIG. 1 is a block diagram showing a configuration of a light source device according to a first example embodiment of the present invention.

FIG. 2 is a block diagram showing a configuration of a light source device according to a second example embodiment of the present invention.

FIG. 3 is a flowchart showing a procedure of a chromaticity adjustment method of the light source apparatus shown in FIG. 2.

FIG. 4 is a chromaticity diagram in which the change in the chromaticity of the white light emitted by a light source device having no chromaticity adjustment mechanism is plotted in the xy chromaticity coordinate.

FIG. 5 is a diagram showing changes in the illuminance maintenance rate of each of the blue light and the yellow fluorescence of the light source device having no chromaticity adjustment mechanism;

FIG. 6 is a block diagram showing a configuration of a light source device is a third example embodiment of the present invention.

FIG. 7 is a configuration diagram showing a configuration of a phosphor wheel used in the light source device is a fourth example embodiment of the present invention.

FIG. 8 is a block diagram showing a configuration of the projector is a sixth example embodiment of the present invention.

FIG. 9 is a block diagram showing a configuration of a projector according to a seventh example embodiment of the present invention.

EXAMPLE EMBODIMENTS

Next, example embodiments of the present invention are next described with reference to the accompanying drawings.

First Example Embodiment

FIG. 1 is a block diagram showing a configuration of a light source device according to a first example embodiment of the present invention. Referring to FIG. 1, light source device 1 includes excitation light source 101, phosphor wheel 105, adjustment unit 106, and motor 112. Light source device 1 is a device that emits mixed color light 121. Light source device 1 is mainly used as a light source of a projector.

Excitation light source 101 emits excitation light 120. A solid-state light source such as an LED or an LD can be used as excitation light source 101.

Phosphor wheel 105 is disposed at a position at which excitation light 120 is irradiated. Excitation light 120 emitted from excitation light source 101 enters phosphor wheel 105. Phosphor wheel 105 converts a portion of excitation light 120 into fluorescent light and emits mixed light 121 including fluorescent light and the remainder of excitation light 120. Mixed color light 121 emitted from phosphor wheel 105 is light output from light source device 1.

Motor 112 rotates phosphor wheel 105. Adjustment unit 106 adjusts the rotational frequency of motor 112 so that the chromaticity of mixed color light 121 emitted from phosphor wheel 105 becomes a predetermined value. The rotation speed of phosphor wheel 105 changes in conjunction with the change in the rotational frequency of motor 112.

Next, the chromaticity adjustment principle of light source device 1 of the present example embodiment will be described.

When phosphor wheel 105 rotates, the air around phosphor wheel 105 is swirled in the rotational direction of phosphor wheel 105 by the frictional force between phosphor wheel 105 and the air molecules. The rocked air forms a flow in the radial direction of phosphor wheel 105. In this manner, phosphor wheel 105 can be cooled by rotating phosphor wheel 105 to generate air flow. The higher the amount of air flow, i.e., the higher the rotational speed, the greater is the effect of cooling phosphor wheel 105, resulting in a decrease in the temperature of the phosphor.

The conversion efficiency (internal quantum efficiency) for converting the excitation energy obtained from excitation light 120 into fluorescent light changes in accordance with the temperature of the phosphor. In the present example embodiment, the internal quantum efficiency of the phosphor is controlled by changing the rotation speed of phosphor wheel 105, and the ratio between excitation light 120 and the fluorescent light that are included in mixed light 121 is adjusted.

Further, by rotating phosphor wheel 105, the position on the phosphor wheel at which the excitation light 120 is irradiated can be changed. In this case, the irradiation time of excitation light 120 per unit area on phosphor wheel 105 during one rotation of phosphor wheel 105 changes according to the rotation speed. When the rotation speed is increased, the irradiation time of excitation light 120 per unit area is shortened, and as a result, the temperature of the phosphor is lowered. Conversely, when the rotation speed is decreased, the irradiation time of excitation light 120 per unit area becomes longer, and as a result, the temperature of the phosphor rises. Due to both the synergistic effect of the cooling action based on the air flow and the cooling action based on the irradiation time of excitation light 120 per unit area, it is possible to efficiently adjust the ratio of excitation light 120 and fluorescent light that are included in mixed light 121.

Hereinafter, the operation and effect of light source device 1 will be described in detail together with the problem in which the color of mixed light 121 changes.

First, the problem in which the color of mixed light changes in the light source device will be described.

Due to deterioration because of aging, the amount of excitation light emitted from the excitation light source may decrease. In this case, since the amount of excitation light irradiated to the phosphor also decreases, the temperature of the phosphor decreases. When the temperature of the phosphor decreases, since the internal quantum efficiency rises, mixed color light having a higher ratio of fluorescent light than excitation light is emitted from the light source device.

In addition, the degradation rate of the phosphor wheel may differ from that of the excitation light source. For example, when the deterioration rate of the phosphor wheel is higher than that of the excitation light source, the decrease in the amount of fluorescent light emitted by the phosphor proceeds faster than the decrease in the amount of excitation light emitted by the excitation light source. Therefore, mixed color light having a ratio of excitation light higher than that of fluorescent light is emitted from the light source device.

Conversely, when the degradation rate of the excitation light source is higher than the degradation rate of the phosphor wheel, the decrease in the amount of excitation light emitted by the excitation light source proceeds faster than the decrease in the amount of fluorescence emitted by the phosphor. Therefore, mixed color light including fluorescent light that has a higher ratio than that of excitation light is emitted from the light source device.

As described above, due to deterioration of the excitation light source and the phosphor because of aging, a problem in which the color of the mixed light emitted from the light source device changes may occur.

According to light source device 1 of the present example embodiment, the problem in which the color of mixed light 121 changes can be solved as follows.

A case where the amount of fluorescent light included in mixed color light 121 increases is assumed. The chromaticity value of mixed color light 121 before the amount of fluorescent light increases is set as a target value (the predetermined value). Adjustment unit 106 decreases the rotational frequency of motor 112 so that the chromaticity of mixed color light 121 becomes a target value (the predetermined value). Thus, the temperature of the phosphor increases, and the internal quantum efficiency of the phosphor decreases. As a result, the ratio of fluorescent light included in mixed color light 121 decreases.

A case where the amount of excitation light 120 included in mixed light 121 increases is assumed. The chromaticity value of mixed color light 121 before the amount of excitation light 120 increases is set as a target value (the predetermined value). Adjustment unit 106 increases the rotational frequency of motor 112 so that the chromaticity of mixed color light 121 becomes a target value (the predetermined value). Thus, the temperature of the phosphor decreases, and the internal quantum efficiency increases. As a result, the ratio of fluorescent light included in mixed color light 121 increases.

Therefore, according to light source device 1 of the present example embodiment, when light source device 1 is used for a long period of time, it is possible to reduce a change in the color of light emitted by light source device 1.

<Modifications>

In light source device 1 of the present example embodiment, adjustment unit 106 may include a color sensor that measures the chromaticity of mixed color light 121, and a motor rotational frequency determination unit that determines the rotational frequency of the motor based on the measurement value of the color sensor.

In light source device 1 of the present example embodiment, phosphor wheel 105 includes: a substrate that is rotatable; a phosphor layer that is formed on the substrate along the circumferential direction and that converts a part of excitation light into fluorescent light to emit mixed light 121; and a reflective layer that is provided between the substrate and the phosphor layer and that transmits a part of mixed light 121 and reflects the remaining part. The color sensor may receive a part of mixed color light 121 that passed through the reflective layer.

Further, in light source device 1 of the present example embodiment, adjustment unit 106 may include a memory that stores a chromaticity value, and a motor rotational frequency determination unit that determines the rotational frequency of the motor based on the difference between the chromaticity of mixed light 121 measured by the color sensor and the chromaticity stored by the memory.

Further, in light source device 1 of the present example embodiment, adjustment unit 106 may include a timer that measures the irradiation time of irradiating phosphor wheel 105 with excitation light 121, and a motor rotational frequency determination unit that changes the rotation frequency of the motor to a predetermined rotational frequency when the irradiation time measured by the timer reaches a predetermined time.

Further, in light source device 1 of the present example embodiment, a part of the substrate of phosphor wheel 105 may be made of a metal substrate.

Second Example Embodiment

FIG. 2 is a block diagram showing a configuration of a light source device according to a second example embodiment of the present invention. Referring to FIG. 2, light source device 2 includes excitation light source 201, polarizing dichroic mirror 202, ¼ wavelength plate 203, condenser lens 204, phosphor wheel 205, color sensor 207, timer 208, motor rotational frequency determination unit 209, memory 210, motor driving unit 211, motor 212, and lens 213. The portion that includes color sensor 207, timer 208, motor driving unit 211, and motor rotational frequency determination unit 209 can be referred to as an adjustment unit.

Excitation light source 201 emits s-polarized excitation light toward polarizing dichroic mirror 202. As excitation light source 201, a solid-state light source such as an LD can be used. Here, excitation light source 201 includes a blue LD and a collimator lens for collimating the emitted light of the blue LD. When a light source such as an LED which does not have polarized light is used, a polarization conversion element which aligns incident light with s-polarized light is used.

Polarizing dichroic mirror 202 is disposed so that the blue excitation light (s-polarized light) emitted from excitation light source 201 is incident at an incident angle of approximately 45°. Polarizing dichroic mirror 202 has a property in which, with respect to light in the blue wavelength region, s-polarized light is reflected and p-polarized light is transmitted, and further, light in a wavelength region other than the blue wavelength region is transmitted. Polarizing dichroic mirror 202 reflects the blue excitation light (s-polarized light) from excitation light source 201 toward ¼ wavelength plate 203. In the portion composed of excitation light source 201 and polarizing dichroic mirror 202, the correspondence relationship between s-polarized light/p-polarized light and reflection/transmission may be reversed.

The blue excitation light reflected by polarizing dichroic mirror 202 is irradiated on phosphor wheel 205 via ¼ wavelength plate 203 and condenser lens 204. ¼ wavelength plate 203 can convert linearly polarized light into circularly polarized light or circularly polarized light into linearly polarized light by applying a phase difference of $\pi/2$ ($=\lambda/4$)

to two polarization components that are orthogonal to each other. Condenser lens 204 condenses the excitation light that passed through ¼ wavelength plate 203 on phosphor wheel 205.

Phosphor wheel 205 includes a thin disk-shaped transparent substrate. The transparent substrate is rotatable about the center of the disk surface. The transparent substrate is made of sapphire, for example. A reflective layer that reflects visible light is provided on the transparent substrate. A phosphor layer that includes a phosphor that absorbs blue excitation light and emits yellow fluorescent light is provided on the reflective layer. Both the reflective layer and the phosphor layer are formed in an annular shape along the circumferential direction.

In the phosphor layer, the phosphor is excited by the incident blue excitation light. The excited phosphor emits yellow fluorescent light in all directions. Of the yellow fluorescent light emitted in all directions, the yellow fluorescent light directed toward the reflection layer side is reflected toward the condenser lens 204 side by the reflection layer. Here, since the reflection layer does not constitute the total reflection surface, a part (comma count percent) of the yellow fluorescent light is transmitted through the reflection layer.

A part of blue excitation light that entered the phosphor layer from the condenser lens 204 side reaches the reflection layer without being absorbed by the phosphor. The reflection layer reflects the arrived blue excitation light toward the phosphor layer. Here, since the reflection layer does not constitute a total reflection surface, a part (comma count percent) of the reached blue excitation light is transmitted through the reflection layer. The blue excitation light reflected by the reflection layer again travels in the phosphor layer toward the condenser lens 204 side.

In phosphor wheel 205, the phosphor layer emits white light, which is mixed color light that includes blue excitation light and yellow fluorescent light, toward condenser lens 204. On the other hand, white light, which is mixed color light that includes yellow fluorescent light and blue excitation light that have passed through the reflective layer, is emitted from the back surface of phosphor wheel 205, i.e., the back surface of the surface irradiated with the excitation light. The reflective layer is configured to pass a trace amount of white light necessary for color sensor 207 to measure chromaticity. The chromaticity of white light that passed through the reflection layer substantially matches the chromaticity of white light from the phosphor layer toward the condenser lens 204 side.

Color sensor 207 is disposed at the back surface side of phosphor wheel 205. Color sensor 207 has a function of measuring the chromaticity of white light that passed through the reflective layer. As the chromaticity measurement function, the function of an existing chromatometer can be applied. As an example, a configuration for obtaining chromaticity information from the ratio of RGB will be briefly described below.

Color sensor 207 has a first light receiving surface with a red filter, a second light receiving surface with a green filter, and a third light receiving surface with a blue filter. The red filter transmits light in the red wavelength region of visible light, and absorbs light in other wavelength regions. The green filter transmits light in the green wavelength region of visible light, and absorbs light in other wavelength regions. The blue filter transmits light in the blue wavelength region of visible light, and absorbs light in other wavelength regions. The areas of the first, second and third light receiving surfaces are the same. Color sensor 207 measures the amount of light (red component) incident on the first light receiving surface, the amount of light (green component) incident on the second light receiving surface, and the amount of light (blue component) incident on the third light receiving surface, respectively. Color sensor 207 converts the measurement information into chromaticity information. Color sensor 207 transmits the chromaticity information to motor rotational frequency determination unit 209.

Timer 208 measures the total driving time of light source device 2. Here, the total driving time means the total sum of the times during which the phosphor wheel 205 is irradiated with excitation light.

Motor rotational frequency determination unit 209 includes memory 210. Memory 210 stores chromaticity data for comparison. In the present example embodiment, as the chromaticity for comparison, memory 210 stores chromaticity data measured by color sensor 207 at the time of initial driving, that is, when first driving light source device 2. Motor rotational frequency determination unit 209 performs a chromaticity adjustment process to be described later, determines the rotational frequency of the motor, and sends the information thereof to motor driving unit 211.

Motor 212 rotates phosphor wheel 205. Motor driving unit 211 rotates motor 212 based on the information of the rotational frequency of the motor transmitted from motor rotational frequency determining unit 209.

Next, the operation of light source device 2 of the present example embodiment for obtaining white light including blue excitation light and yellow fluorescent light will be described in detail.

Excitation light source 201 emits excitation light of blue, which is S-polarized light. Blue excitation light (S-polarized light) emitted from excitation light source 201 enters polarizing dichroic mirror 202. Polarizing dichroic mirror 202 reflects the blue excitation light (S-polarized light) toward ¼ wavelength plate 203. The blue excitation light (S-polarized light) is circularly polarized by passing through ¼ wavelength plate 203. The blue excitation light (circularly polarized light) that passed through ¼ wavelength plate 203 enters condenser lens 204. Condenser lens 204 condenses the blue excitation light (circularly polarized light) on phosphor wheel 205.

In phosphor wheel 205, a part of the blue excitation light (circularly polarized light) passes through the phosphor layer to reach the reflective layer. The reflection layer reflects the reached blue excitation light (circularly polarized light) toward the condenser lens 204 side. A part of the blue excitation light (circularly polarized light) reflected by the reflective layer passes through the phosphor layer. The blue excitation light (circularly polarized light) that passed through the phosphor layer enters ¼ wavelength plate 203 via condenser lens 204.

The blue excitation light (circularly polarized light) from the reflection layer passes through ¼ wavelength plate 203 to become p-polarized light. The blue excitation light (p-polarized light) that passed through ¼ wavelength plate 203 passes through polarizing dichroic mirror 202.

In the phosphor layer, the phosphor is excited by the incident blue excitation light. The excited phosphor emits yellow fluorescent light in all directions. Of the yellow fluorescent light emitted in all directions, the yellow fluorescent light directed toward the reflection layer side is reflected toward the condenser lens 204 side by the reflection layer. The phosphor layer emits yellow fluorescent light toward the condenser lens 204 side. The yellow fluorescent light from the phosphor layer passes through condenser lens 204, ¼ wavelength plate 203, and polarizing dichroic mirror 202 in this order.

The blue excitation light and the yellow fluorescent light that each passed through polarizing dichroic mirror 202 enter lens 213 in the same optical path. Lens 213 emits white light, which is mixed color light including blue excitation light and yellow fluorescent light. The white light emitted from lens 213 is light emitted from light source device 2.

On the other hand, from the back surface of phosphor wheel 205, white light, which is mixed color light that includes blue excitation light and yellow fluorescent light that each passed through the reflective layer, is emitted. The white light emitted from the back surface of phosphor wheel 205 enters color sensor 207.

Next, the chromaticity adjustment operation of light source device 2 of the present example embodiment will be described in detail.

FIG. 3 is a flowchart showing a procedure of the chromaticity adjustment method of light source device 2. The chromaticity adjustment method of light source device 2 will be described with reference to FIGS. 2 and 3.

When the time measured by the timer 208 reaches a predetermined time, in step S10, color sensor 207 measures the chromaticity of white light emitted from the back surface of phosphor wheel 205. Then, color sensor 207 outputs chromaticity information based on the measurement result to motor rotational frequency determination unit 209. Here, the predetermined time can be arbitrarily set. For example, 100 hours or 200 hours may be set as a predetermined time.

In step S11, motor rotational frequency determination unit 209 calculates a chromaticity difference, which is the difference between the chromaticity included in the chromaticity information output from color sensor 207 and the chromaticity for comparison (initial chromaticity) stored in memory 220.

In step S12, motor rotational frequency determination unit 209 determines the rotational frequency of motor 212 based on the chromaticity difference calculated in step S11. Then, motor rotational frequency determining unit 209 sends a signal indicating the determined rotational frequency to motor driving unit 211. Here, a table, in which the chromaticity difference and the rotational frequency of motor 212 are stored in association with each other, may be stored in memory 210, and motor rotational frequency determination unit 209 may determine the rotational frequency of motor 212 with reference to the table.

In step S13, motor driving unit 211 receives a signal indicating the rotational frequency of the motor from motor rotational frequency determination unit 209. Motor driving unit 211 rotates motor 212 at the rotational frequency indicated by the received signal (the rotational frequency determined by motor rotational frequency determination unit 209).

According to light source device 2 of the present example embodiment described above, similarly to the first example embodiment, it is possible to prevent a change in the color of the emitted light when light source device 2 is used for a long period of time.

Hereinafter, the operation and effect of light source device 2 will be described in detail together with the problem in which the color of white light changes.

First, in a light source device that does not have a chromaticity adjustment mechanism, a problem, in which the color of white light changes due to deterioration of an excitation light source because of aging, will be described.

FIG. 4 is a chromaticity diagram in which a change in chromaticity of white light emitted from a light source device having no chromaticity adjustment mechanism is plotted on xy chromaticity coordinates. The xy chromaticity coordinates are based on tristimulus values XYZ, which are the three primary colors of a color system. In the xy chromaticity coordinates, the yellow color becomes stronger toward the upper right (in the direction of the arrow in the figure). As can be seen from FIG. 4, the chromaticity plot position shifts upward and rightward according to the lapse of time. This means that the yellow component of light emitted from the light source device becomes stronger according to the lapse of time.

FIG. 5 is a diagram showing a change in the illumination maintenance rate of each of the blue light and the yellow fluorescent light of the light source device that does not have the chromaticity adjustment mechanism. In FIG. 5, the vertical axis represents the illumination maintenance ratio (%), and the horizontal axis represents the driving time of the light source. In FIG. 5, the black diamonds indicate blue light, and the black squares indicate yellow fluorescent light. The illuminance of the blue light and the illuminance of the yellow fluorescence when the driving time is 0 (h) are defined as 100 percent, respectively.

As can be seen from FIG. 5, the illuminance of each of blue light and yellow fluorescent light decreases according to the lapse of time. The decrease rate of the illuminance differs between blue light and yellow fluorescent light. The decrease rate of the illuminance of the blue light is larger than the decrease rate of the illuminance of the yellow fluorescent light. This means that, with respect to blue light and yellow fluorescent light included in white light emitted by the light source device, the ratio of the yellow fluorescent light to the blue light increases according to the lapse of time. This result is consistent with that of FIG. 4.

Namely, from the results of FIGS. 4 and 5, it can be seen that the yellowness of the white light emitted from the light source device increases when the light source device is used for a long period of time.

According to light source device 2 of the present example embodiment, the problem in which the yellowness of white light becomes strong can be solved as follows.

For example, when timer 208 reaches a predetermined time, if the yellow component is increased with respect to the blue component due to a change in the ratio of the blue and yellow components included in the white light, motor rotational frequency determination unit 209 decreases the rotational frequency of motor 212. When the rotational frequency of motor 212 decreases, the rotational speed of phosphor wheel 205 decreases. When the rotation speed of phosphor wheel 205 decreases, since the cooling effect accompanying the rotation of the wheel decreases and the irradiation time of excitation light per unit area increases, the temperature of the portion of phosphor wheel 205 irradiated with the excitation light increases. Thus, the temperature of the phosphor increases, and as a result, the internal quantum efficiency decreases. If the internal quantum efficiency decreases, the amount of yellow fluorescent light emitted by the phosphor decreases. As a result, the yellow component of white light emitted by phosphor wheel 205 decreases. Therefore, it is possible to prevent a change in chromaticity of white light emitted from light source device 2.

In addition, when the phosphor is used for a long period of time, the amount of fluorescent light gradually decreases. Due to deterioration of the phosphor because of aging, the ratio of the blue and yellow components contained in the white light changes. For example, if the degradation rate of the phosphor is higher than the degradation rate of the excitation light source, the ratio of yellow fluorescent light to blue light decreases according to the lapse of time. As a result, in the color component of white light emitted from the light source device, blueness may increase according to the lapse of time.

According to light source device 2 of the present example embodiment, the problem in which blueness of white light increases can be solved as follows.

For example, when timer 208 reaches a predetermined time, if the blue component is increased with respect to the yellow component due to a change in the ratio of the blue and yellow components included in white light, motor rotational frequency determination unit 209 increases the rotational frequency of motor 212. When the rotational frequency of motor 212 increases, the rotational speed of phosphor wheel 205 increases. When the rotation speed of phosphor wheel 205 increases, since the cooling effect accompanied by the rotation of the wheel increases and since the irradiation time of the excitation light per unit area decreases, the temperature of the portion of phosphor wheel 205 irradiated with the excitation light of phosphor wheel 205 decreases. Thus, the temperature of the phosphor decreases, and as a result, the internal quantum efficiency increases. If the internal quantum efficiency increases, the amount of yellow fluorescent light emitted by the phosphor increases. As a result, the yellow component of white light emitted by phosphor wheel 205 increases. Therefore, it is possible to prevent a change in chromaticity of white light emitted from light source device 2.

Third Example Embodiment

FIG. 6 is a block diagram showing a configuration of a light source device according to a third example embodiment of the present invention. Referring to FIG. 6, light source device 3 includes excitation light source 301, polarizing dichroic mirror 302, ¼ wavelength plate 303, condenser lens 304, phosphor wheel 305, timer 308, motor rotational frequency determination unit 309, memory 310, and motor driving unit 311. Here, excitation light source 301, polarizing dichroic mirror 302, ¼ wavelength plate 303, condenser lens 304, and phosphor wheel 305 are the same as those described in the second example embodiment. The portion including timer 308, motor rotational frequency determination unit 309, memory 310, and motor driving unit 311 can be referred to as an adjustment unit.

Timer 308 measures the total driving time of light source device 3. Timer 308 is connected to motor rotational frequency determination unit 309. Timer 308 sends information indicating the measured total driving time to motor rotational frequency determination unit 309.

Motor rotational frequency determination unit 309 includes memory 310. Memory 310 stores a table in which the total driving time and the motor rotational frequency corresponding to the total driving time are stored in association with each other. The total driving time and the motor rotational frequency in this table are values acquired in advance.

Hereinafter, a procedure for preparing the table will be briefly described.

First, a light source device having the same configuration as light source device 3 and a color sensor are prepared. The light source device is driven, and the chromaticity of light emitted from the light source device is acquired by using the color sensor at the start of driving, that is, at time 0 (h).

At time t1 (h) after the elapse of a predetermined time, the chromaticity of light emitted from the light source device is acquired by using the color sensor. At this time, the motor rotational frequency of the light source device is adjusted so that the chromaticity of the light acquired by the color sensor is substantially equal to the chromaticity of the light emitted from the light source device at time 0 (h). At time t2 (h) after the elapse of a predetermined time from time t1 (h), the chromaticity of light emitted from the light source device is acquired by using the color sensor in the same manner. Similarly, the motor rotational frequency of the light source device is adjusted so that the chromaticity of the light acquired by the color sensor is substantially equal to the chromaticity of the light emitted from the light source device at time 0 (h). Thereafter, this operation is repeated a plurality of times.

At this time, the time at which the chromaticity of light is measured by the color sensor and the motor rotational frequency after adjustment of the light source device are recorded. The time and motor rotational frequency that are recorded are used as the total driving time and the motor rotational frequency of the table stored in memory 310.

If the configuration of the light source device is the same, it is assumed that the chromaticity of light emitted from the light source device with respect to the total driving time changes substantially in the same manner. That is, the chromaticity of light emitted from light source device 3 that has the same configuration as that of the light source device used for creating the table changes according to the lapse of time in substantially the same manner as the chromaticity of light emitted from the light source device used for creating the table.

Therefore, in light source device 3, when the total driving time reaches a predetermined time, if the motor is rotated at the motor rotational frequency corresponding to the total driving time of the table stored in memory 310, the chromaticity of light emitted from light source device 3 becomes substantially the same as the chromaticity of the light emitted from the light source device 3 at time 0 (h). Namely, by using the table stored in memory 310, light source device 3 can emit light having substantially the same chromaticity as the chromaticity of light that has been emitted at time 0 (h) without using the color sensor.

The above is the description of the table creation.

Reference is again made to FIG. 6. Motor rotational frequency determination unit 309 acquires the motor rotational frequency corresponding to the total drive time from the table of memory 310 based on information on the total drive time sent from timer 308. Motor rotational frequency determination unit 309 sends information on the motor rotational frequency acquired from the table in memory 310 to motor driving unit 311.

Motor driving unit 311 rotates motor 312 according to the motor rotational frequency sent from motor rotational frequency determination unit 309. That is, phosphor wheel 305 attached to motor driving unit 311 rotates at a rotation speed corresponding to the total driving time of light source device 3.

Like light source device 2, light source device 3 is a device that converts excitation light emitted from excitation light source 301 into white light and emits white light. Hereinafter, the chromaticity adjustment operation of light source device 3 of the present example embodiment will be described in detail.

When light source device 3 is driven, timer 308 measures the total driving time of light source device 3. When the total driving time measured by timer 308 reaches a predetermined time, information on the measured total driving time is sent from timer 308 to motor rotational frequency determination unit 309. Motor rotational frequency determination unit 309 refers to the table stored in memory 310 to acquire information on the motor rotational frequency corresponding to the total driving time. The acquired information on the motor rotational frequency is sent to motor driving unit 311.

Motor drive unit 311 rotates motor 312 at the supplied motor rotational frequency. As motor 312 rotations, phosphor wheel 305 rotates.

In the present example embodiment, because a color sensor is not used, cost reduction can be achieved.

<Modifications>

As described above, when the rotational speed of the phosphor wheel of the light source device is not changed, white light emitted from the light source device has a high yellowness. Therefore, when the time measured by timer 308 reaches a predetermined time, motor rotational frequency determination unit 309 may set the value of the rotational frequency of motor 312 to a value smaller than the value of the rotational frequency of motor 312 at time 0 (h) (initial state). As a result, motor rotational frequency determination unit 309 can prevent a change in chromaticity of white light emitted from light source device 3.

Motor rotational frequency determination unit 309 may decrease the rotational frequency of motor 312 in accordance with an increase in the time measured by timer 308. In this case, motor rotational frequency determination unit 309 can finely adjust the chromaticity of white light emitted from light source device 3, as compared with the above-described control in which the rotational frequency of motor 312 is changed every predetermined time.

Fourth Example Embodiment

The light source device according to the fourth example embodiment of the present invention has the same configuration as light source device 2 according to the second example embodiment except that the phosphor wheel is different.

FIG. 7 is a configuration diagram showing a configuration of a phosphor wheel used in the light source device according to the present example embodiment. As shown in FIG. 7, substrate 44 of phosphor wheel 4 includes transparent substrate 41 and metal substrate 42.

Transparent substrate 41 and metal substrate 42 integrally form thin disk-shaped substrate 44. Transparent substrate 41 is formed as a fan shape. A portion obtained by removing fan-shaped transparent substrate 41 from disk-shaped substrate 44 is metal substrate 42. Here, the ratio of metal substrate 42 to the entire of substrate 44 is larger than the ratio of transparent substrate 41 to the entire of substrate 44. As metal substrate 42, aluminum which is excellent in heat dissipation and low in cost is preferably used. Sapphire that has excellent heat dissipation properties is preferably used as transparent substrate 41.

In substrate 44, phosphor layer 43 that contains a phosphor is formed in an annular shape along the circumferential direction. A reflective layer is formed between phosphor layer 43 and transparent substrate 41. The structure of the reflective layer is the same as the reflective layer described in the second example embodiment.

Phosphor wheel 4 can be used in the same manner as phosphor wheel 205 in light source device 2.

The light source device of the present example embodiment exhibits the same operation and effect as those of light source device 2. However, most of substrate 44 of phosphor wheel 4 is made of metal substrate 42 that has excellent heat radiation properties. Therefore, phosphor wheel 4 has excellent heat radiation as compared with phosphor wheel 205. Further, since metal substrate 42 is inexpensive, the cost can be reduced as compared with phosphor wheel 205.

Fifth Example Embodiment

The light source device according to the fifth example embodiment of the present invention has the same configuration as light source device 2 according to the second example embodiment except that the phosphor wheel is different.

In the light source device of the present example embodiment, the phosphor wheel includes a thin disk-shaped substrate and a reflective layer. The substrate is made of a ceramic crystal. The ceramic crystal is made of a transparent material containing a fluorescent material. The transparent material is, for example, an inorganic crystal, glass, or polymer material. The fluorescent material is, for example, a rare earth ion, a transition metal ion, an organic dye molecule, a phosphor, or the like. Inorganic crystals doped with rare earth ions, such as cerium-doped yttrium aluminum garnet (Ce:YAG), or inorganic crystals doped with transition metal ions, such as chromium-doped sapphire or titanium-doped sapphire, can be used as phosphors. In the present example embodiment, for example, a phosphor of Ce:YAG ceramics crystal is used for the substrate. A reflective layer is provided on one surface of the substrate. The reflective layer is the same as that described in the second example embodiment.

The light source device of the present example embodiment also exhibits the same operation and effect as those of light source device 2 described in the second example embodiment.

Sixth Example Embodiment

FIG. 8 is a block diagram showing a configuration of DLP (Digital Light Processing) projector 5 according to a sixth example embodiment of the present invention. As shown in FIG. 8, projector 5 includes light source device 2, color wheel 501, light tunnel 502, TIR (total internal reflection prism) prism 503, DMD (Digital Micromirror Device) 504, projection lens 505, and lens group 506. Light source device 2 has been described in the second embodiment.

Color wheel 501 has a thin disk shape and is rotatable about a central axis of the disk surface. Each of the red, green and blue filters is provided on the surface of color wheel 501. The red, green and blue filters are arranged in order in the circumferential direction. The red filter has a characteristic in which light in a red wavelength region is transmitted and light in a wavelength region other than the red wavelength region is absorbed. The green filter has a characteristic in which light in a green wavelength region is transmitted and light in a wavelength region other than the green wavelength region is absorbed. The blue filter has a characteristic in which light in a blue wavelength region is transmitted and light in a wavelength region other than the blue wavelength region is absorbed.

Light tunnel 502 is disposed at a position where each monochromatic light that passed through color wheel 501 can enter. Light tunnel 502 homogenizes the illuminance distribution of incident light and emits the light.

TIR prism 503 is disposed at a position where light emitted from light tunnel 502 can enter. TIR prism 503 is a laminate of two triangular prisms, and includes an air layer between the prisms.

DMD504 is disposed at a position where light from TIR prism 503 can enter. DMD504 includes an imaging surface comprising a plurality of micromirrors that are arranged in two dimensions. DMD504 forms images by modulating incident light in accordance with input video signals. DMD504 is an example of an imaging device.

In projector 5, light source device 2 emits white light. The white light emitted from light source device 2 enters color wheel 501. When color wheel 501 rotates, white light is sequentially irradiated to the red, green, and blue filters of the color wheel 501. Color wheel 501 sequentially emits red light, green light, and blue light.

Red light, green light, and blue light emitted from color wheel 501 enter light tunnel 502. In light tunnel 502, the illuminance distributions of the entered red light, green light, and blue light are made uniform. Light tunnel 502 sequentially emits red light, green light, and blue light.

Red light, green light, and blue light emitted from light tunnels 502 enter DMD504 through TIR prisms 503. DMD504 modulates the red light to form a red image, modulates the green light to form a green image, and modulates the blue light to form a blue image. DMD504 sequentially emits red image light, green image light, and blue image light. The red image light, the green image light, and the blue image light enter projection lens 505 via TIR prism 503. Projection lenses 505 overlappingly projects the red image, the green image, and the blue image formed by DMD504 on a screen (not shown).

Seventh Example Embodiment

FIG. 9 is a block diagram showing a configuration of LCD (liquid crystal display) type projector 6 according to a seventh example embodiment of the present invention. As shown in FIG. 9, projector 6 includes light source device 2, fly-eye lens system 601, dichroic mirrors 602R and 602G, lens 603, mirror 604, lens 605, mirror 606, mirror 607, lenses 608R, 608G, and 608B, liquid crystal displays 609R, 609G, and 609B, cross dichroic prism 610, and projection lens 611. Light source device 2 has been described in the second example embodiment.

Fly-eye lens system 601 homogenizes the illuminance distribution of light that entered fly-eye lens system 601 and emits the light. Fly-eye lens system 601 is disposed at a position where white light emitted from light source device 2 can enter.

Dichroic mirror 602R has a characteristic in which light in a red wavelength region is reflected and light in a wavelength region other than the red wavelength region is transmitted. Dichroic mirror 602G has a characteristic in which light in a green wavelength region is reflected and light in a wavelength region other than the green wavelength region is transmitted.

Dichroic mirror 602R is disposed so that white light emitted by fly-eye lens system 601 is incident at an incident angle of approximately 45°. Red light reflected by dichroic mirror 602R enters liquid crystal display 609R via mirror 607 and lens 608R.

Dichroic mirror 602G is disposed so that light transmitted through dichroic mirror 602R (including blue and green components) is incident at an incident angle of approximately 45°. Green light reflected by dichroic mirror 602G enters liquid crystal display 609G via lens 608G.

Blue light transmitted through dichroic mirror 602G enters liquid crystal display 609B through lens 603, mirror 604, lens 605, mirror 606, and lens 608B. Here, lens 603 and lens 605 comprise a relay lens.

Liquid crystal display 609R forms a red image by modulating incident red light in accordance with an input video signal (R). Liquid crystal display 609B forms a blue image by modulating incident blue light in accordance with an input video signal (B). Liquid crystal display 609G forms a green image by modulating incident green light in accordance with an input video signal (G).

The red image light emitted from liquid crystal display 609R, the blue image light emitted from liquid crystal display 609B, and the green image light emitted from liquid crystal display 609G enter projection lens 611 through cross dichroic prism 610. Cross dichroic prism 610 combines the image lights of the respective colors emitted from liquid crystal displays 609R, 609G, and 609B. Here, liquid crystal displays 609R, 609G, and 609B are examples of image forming elements.

Projection lens 611 projects the red image light, the blue image light, and the green image light that entered from cross dichroic prism 610 on a screen (not shown).

Each of the embodiments described above is an example of the present invention, and is not intended to limit the present invention. The configuration of the present invention can be changed within the scope of technical ideas that can be understood by a person skilled in the art.

EXPLANATION OF REFERENCE NUMBERS

1 Light source device
101 Excitation light source
105 Phosphor wheel
106 Adjustment unit
112 Motor
120 Excitation light
121 Fluorescent light

The invention claimed is:

1. A light source device, comprising:
an excitation light source that emits excitation light;
a phosphor wheel in which the excitation light is irradiated to convert a part of the excitation light into fluorescent light, said phosphor wheel emitting mixed color light including the fluorescent light and a remaining part of the excitation light;
a motor that rotates said phosphor wheel; and
an adjustment unit that, based on an aging of the excitation light source or said phosphor wheel, adjusts a rotational frequency of said motor so that a chromaticity of the mixed color light emitted from said phosphor wheel becomes a predetermined value.

2. The light source device according to claim 1, wherein a position on said phosphor wheel to which the excitation light is irradiated is changed by rotating said phosphor wheel.

3. The light source device according to claim 1, wherein said adjustment unit includes:
a color sensor that measures a chromaticity of the mixed color light; and
a motor rotational frequency determination unit that determines the rotational frequency of said motor based on a measurement value of said color sensor.

4. The light source device according to claim 3, wherein said phosphor wheel includes:
a substrate that is rotatable;
a phosphor layer that is formed on said substrate along a circumferential direction and that converts a part of the excitation light into fluorescent light to emit the mixed color light; and a reflective layer that is provided between said substrate and said phosphor layer and that transmits a part of the mixed color light and reflects a remaining part of the mixed color light,
wherein said color sensor receives a part of the mixed color light that passed through said reflective layer.

5. The light source device according to claim 4, wherein a portion of said substrate of said phosphor wheel comprises a metal substrate.

6. The light source device according to claim 3, wherein said adjustment unit includes a memory that stores chromaticity values, and
wherein said motor rotational frequency determination unit determines the rotational frequency of said motor based on a difference between the chromaticity of the mixed color light measured by said color sensor and the chromaticity stored in said memory.

7. The light source device according to claim 1, wherein said adjustment unit includes:
a timer that measures an irradiation time during which said phosphor wheel is irradiated with the excitation light; and
a motor rotational frequency determination unit that changes the rotational frequency of said motor to a predetermined rotational frequency when the irradiation time, measured by said timer, reaches a predetermined time.

8. The light source device according to claim 7, wherein said motor rotational frequency determination unit sets the rotational frequency of said motor to a value smaller than a value of the rotational frequency of said motor in an initial state when the time measured by said timer reaches a predetermined time.

9. The light source device according to claim 1, wherein said adjustment unit includes;
a timer that measures an irradiation time during which said phosphor wheel is irradiated with the excitation light; and
a motor rotational frequency determination unit that decreases the rotational frequency of said motor in response to an increase in the irradiation time measured by said timer.

10. A projector comprising:
a light source device according to claim 1;
an image forming element that modulates light emitted from said light source device to form an image; and
a projection lens that projects the image.

11. The light source device according to claim 1, wherein the adjustment unit adjusts the rotational frequency of said motor based on the aging of the excitation light source.

12. The light source device according to claim 1, wherein the adjustment unit adjusts the rotational frequency of said motor based on the aging of said phosphor wheel.

13. The light source device according to claim 1, wherein the adjustment unit adjusts the rotational frequency of said motor by a steady-state change in the rotational frequency.

14. A chromaticity adjustment method in a light source device that includes a phosphor wheel that converts a part of excitation light, emitted by an excitation light source, into fluorescent light to emit mixed color light that includes the fluorescent light and a remaining part of the excitation light, said chromaticity adjustment method comprising:
rotating said phosphor wheel; and
adjusting a rotational speed of said phosphor wheel, based on an aging of the excitation light source or said phosphor wheel, such that a chromaticity of the mixed color light emitted from said phosphor wheel becomes a predetermined value.

15. The chromaticity adjustment method according to claim 14, wherein the adjusting of the rotational speed of said phosphor wheel is conducted based on the aging of the excitation light source.

16. The chromaticity adjustment method according to claim 14, wherein the adjusting of the rotational speed of said phosphor wheel is conducted based on the aging of said phosphor wheel.

17. The chromaticity adjustment method according to claim 14, wherein the adjusting of the rotational speed of said phosphor wheel is conducted by a steady-state change in the rotational frequency.

18. The chromaticity adjustment method according to claim 14, wherein the adjusting of the rotational speed of said phosphor wheel includes measuring, by a timer, an irradiation time during which said phosphor wheel is irradiated with the excitation light.

19. The chromaticity adjustment method according to claim 18, wherein the adjusting of the rotational speed of said phosphor wheel further includes changing the rotational frequency of said motor to a predetermined rotational frequency when the irradiation time, measured by said timer, reaches a predetermined time.

20. The chromaticity adjustment method according to claim 18, wherein the adjusting of the rotational speed of said phosphor wheel further includes decreasing the rotational frequency of said motor in a response to an increase in the irradiation time measured by said timer.

* * * * *